W. COATSWORTH.
TRUCK WHEEL SHOE.
APPLICATION FILED JAN. 20, 1919. RENEWED OCT. 15, 1921.

1,398,890.

Patented Nov. 29, 1921.

Witness
E. R. Ruppert.

Inventor
William Coatsworth
By Victor J. Evans
Attorney

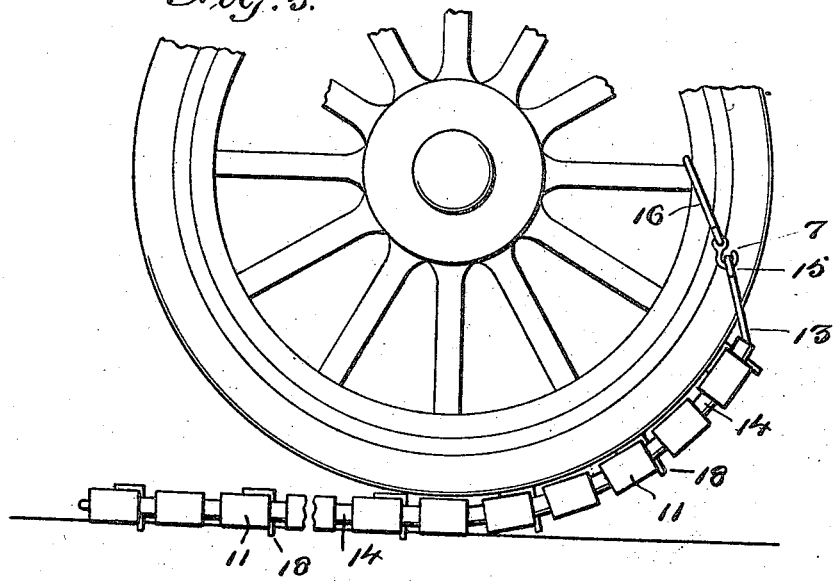
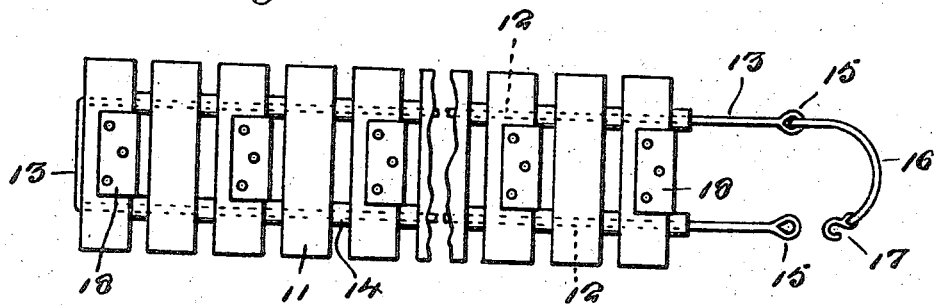
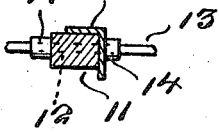

UNITED STATES PATENT OFFICE.

WILLIAM COATSWORTH, OF HIGHLAND PARK, MICHIGAN.

TRUCK-WHEEL SHOE.

1,398,890.   Specification of Letters Patent.   Patented Nov. 29, 1921.

Application filed January 20, 1919, Serial No. 272,131. Renewed October 15, 1921. Serial No. 508,050.

*To all whom it may concern:*

Be it known that I, WILLIAM COATSWORTH, a citizen of the United States, residing at Highland Park, in the county of Wayne and State of Michigan, have invented new and useful Improvements in Truck-Wheel Shoes, of which the following is a specification.

The invention relates to an improved wheel shoe for the use on the periphery of a wheel of a motor truck or other like vehicle, to increase the traction of the wheel and enable the vehicle to be driven through mud, sand or the like.

The object of the invention is to provide an improved wheel shoe of this class which is extremely simple in construction, which can be readily manufactured at small cost, which is extremely durable, and which can be readily attached to or removed from a wheel.

With the above and other objects in view, the invention consists in the construction, combination and arrangement of devices hereinafter described and claimed.

In the accompanying drawing:—

Fig. 5 is a view similar to Fig. 1 of a modified form of the invention, but illustrating the same applied to a spoked wheel.

Fig. 6 is a plan view of a form of the invention shown in Fig. 5.

Fig. 7 is a section through one of the blocks and plates of Fig. 6.

Figure 1:
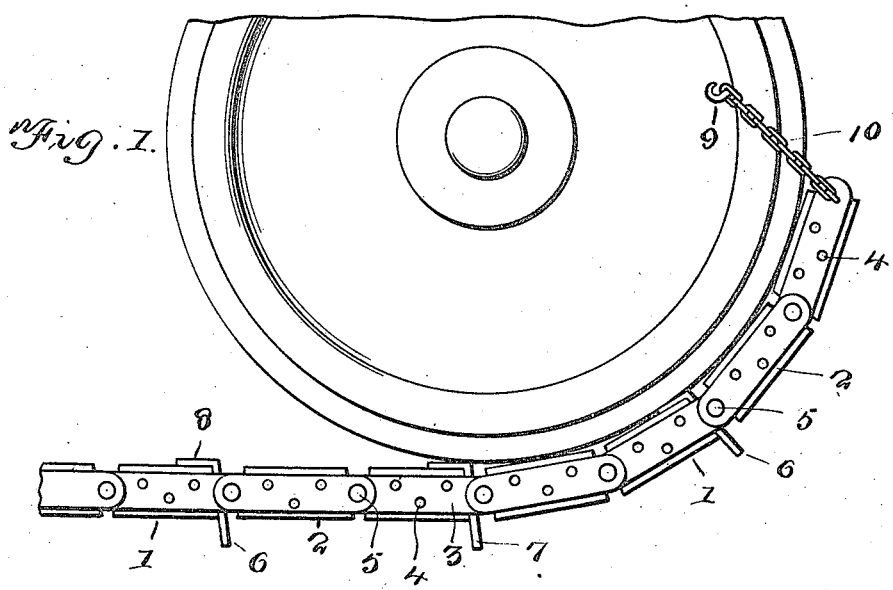
Figure 1 is an elevation of a wheel shoe constructed and arranged in accordance with my invention and showing the same attached to the periphery of the motor truck wheel.
Figure 2:
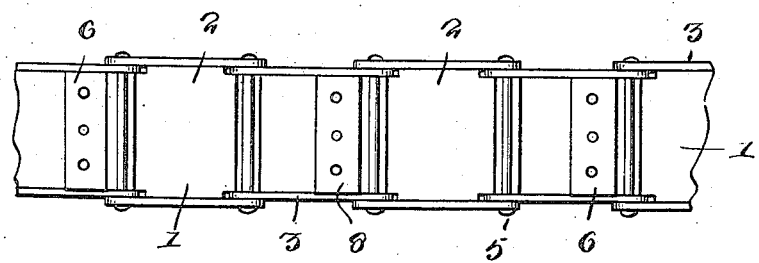
Fig. 2 is a detail plan of the same.
Figure 3:
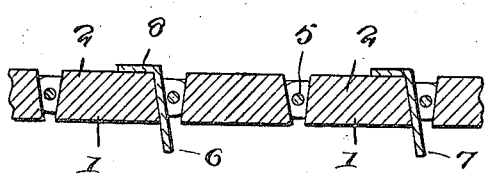
Fig. 3 is a detail longitudinal sectional view of the same.
Figure 4:
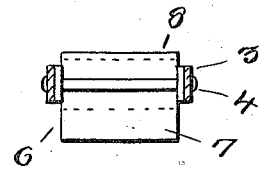
Fig. 4 is a detail transverse sectional view of the same.

My improved shoe comprises a plurality of sections 1, each section comprising a tread block 2 which is made of wood, and a pair of straps 3 which are made of iron and which are secured on the end of the said block by means of screws or rivets 4. The length of the straps is greater than that of the tread block so that the ends of the straps project beyond the ends of the tread block. The end of each tread block is oppositely beveled.

The sections are also arranged with the projecting ends of the straps in overlapping relation, and the ends of the straps have openings, through which pivoting bolts 5 are passed, so that the sections of the shoe are pivotally and flexibly connected together and the ends of the tread block of the various shoes are approximately spaced apart.

Certain of the sections of the shoe are provided with traction plates 6, and each traction plate, which is preferably made of iron or steel, is bent at a point intermediate its ends to form an outer end 7 and an inner arm 8 which is arranged at a suitable angle with respect to the outer arm. Each plate is secured on the beveled front edge of one of the tread blocks as by means of screws or rivets and is also secured to the inner surface of the tread block the arm 7 bearing against the beveled front edge of the tread block and projecting beyond the outer surface thereof, and the arm 8 extending rearwardly and bearing on the inner surface of the tread block as shown. The said plate greatly increases the traction of the wheel, as will be understood. The elements of the individual plates constitute flanges and the plates are approximately of L-shape in cross section, as shown.

The wheel on which the shoe is to be used is provided with attaching hooks 9, or other suitable attaching devices, and one end section of the shoe is provided with chains 10 for engagement by said attaching devices, to secure the tread end of the shoe on the outer side of the tire of the wheel as shown in Fig. 1.

In the modified form of the invention shown in Figs. 5 to 7, inclusive, the tread blocks 11 are shown with straight instead of beveled sides, but it is, of course, obvious that beveled blocks, such as are shown in the preceding form of the invention, may be substituted. The blocks 11 are formed with openings 12, which extend transversely to the blocks and are spaced from each end, the openings in the blocks alining for the purpose of receiving flexible elements 13, which serve to connect the blocks. The elements 13 are herein shown as a continuous chain or cable passing through the openings at one end of the blocks and back to the openings at the opposite end.

The blocks 11 are spaced apart through the medium of sleeves or washers 14, the latter being threaded upon the flexible elements 13, so as to permit of a hinged or pivotal connection between the blocks. The extremities of the flexible elements 13 are formed with eye 15, and connected in one of these eyes is a short flexible member 16, one end of which is provided with a hook 17, for engagement with the eye 15 of the opposite element. This provides convenient means for securing the shoe upon the tread of a spoked wheel, the member 16 being passed through the spokes with the shoe arranged upon the tread of the wheel.

It is also preferred to provide the shoe with traction plates 18, which are similar in construction to the plates 6.

In the use of the invention, the shoe is placed around the upper part of the periphery of the wheel with the free end at its point of contact of the wheel and ground, the opposite end of the shoe being secured to the wheel. The wheel will then ride upon the shoe and will be prevented from slipping and the shoe will also be held against longitudinal movement by reason of its connection with the wheel. This obviates the necessity of anchoring one end of the shoe to some stationary point or object, which is sometimes extremely difficult when the vehicle is traveling over soft and uneven surfaces. Should one rotation of the wheel not be sufficient to extricate the vehicle, the operation may be repeated.

The invention is susceptible of various other changes in its form, proportions and minor details of construction and the right is herein reserved to make such changes as properly fall within the scope of the appended claims.

Having thus described my invention I claim:—

1. A tread block of substantially rectangular formation, and a bent plate carried by said block adjacent a longitudinal edge thereof, one portion of said plate projecting beyond the tread surface of the block to form a traction spur and another portion extending inwardly from the longitudinal edge and bearing on the inner surface of said block.

2. In a device of the class described, a series of blocks forming a tread, the blocks having plane surfaces and flat sides, means connecting the blocks in parallel relation and permitting relative pivotal movement, and plates, L shaped in cross section, connected with the respective blocks, one flange of each plate projecting beyond the outer surface of the block with which it is connected, and the other flange extending across the inner surface of the block in a direction tending to transfer the strain resulting from tractive effort to the inner surface of the block.

3. A shoe for vehicle wheels comprising transversely disposed blocks, means adjacent the ends of said blocks and connecting the same to permit relative pivotal movement thereof, said means comprising flexible elements passing through the blocks and adapted to be secured to the wheel and spacing members carried by the flexible element and interposed between said blocks, and bent plates carried by said blocks and interposed between said connecting means, said plates having arms extending beyond the tread surfaces of the blocks to form traction spurs and inwardly extending arms bearing on the inner surfaces of said blocks.

In testimony whereof I affix my signature.

WILLIAM COATSWORTH.